GEORGE H. WELLER.
Improvement in Harvester-Rakes.

No. 115,141.  Patented May 23, 1871.

Witnesses.
A. W. Almqvist
Wm. H. E. Smith.

Inventor:
G. H. Weller.
Per Munn & Co.
Attorneys.

UNITED STATES PATENT OFFICE.

GEORGE H. WELLER, OF NEW VILLAGE, NEW JERSEY.

IMPROVEMENT IN HARVESTER-RAKES.

Specification forming part of Letters Patent No. 115,141, dated May 23, 1871.

*To all whom it may concern:*

Be it known that I, GEORGE H. WELLER, of New Village, in the county of Warren and State of New Jersey, have invented a new and useful Improvement in Harvesters and Mowers; and I do hereby declare that the following is a full, clear, and exact description thereof, which will enable others skilled in the art to make and use the same, reference being had to the accompanying drawing forming part of this specification.

Figure 1:
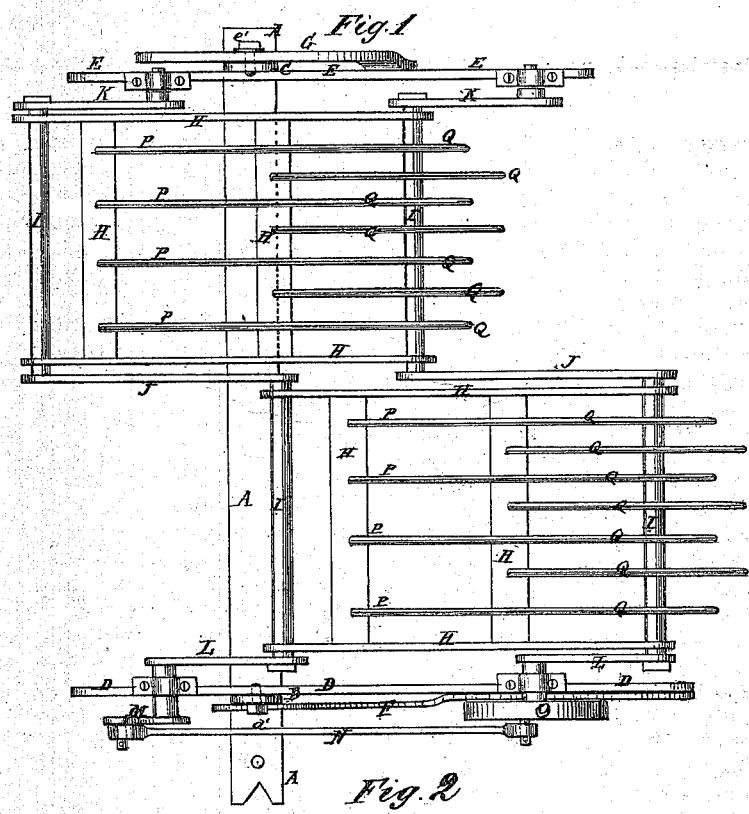
Figure 2:
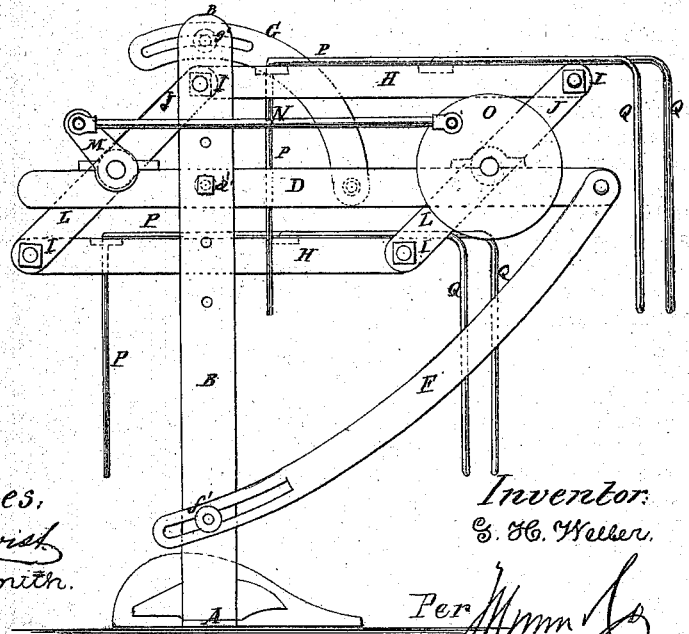

Figure 1 is a top view of my improvement as attached to the cutter-bar of a harvester. Fig. 2 is a side view of the same.

My invention has for its object to furnish an improved device, simple in construction and effective in operation, for moving the cut grain and grass back from the cutters, and for bringing the grain into proper position to be operated upon by the cutters, and which is designed to take the place of the ordinary reel, doing the work of the said reel, and at the same time straightening up the grain that may be bent down; and it consists in the construction and combination of the various parts of the device, as hereinafter more fully described.

A represents the cutter-bar of a harvester. B and C are two posts, the lower ends of which are attached to the outer and inner ends of the cutter-bar A or to its attachments. D and E are two horizontal bars, which are detachably secured to the posts B C near their upper ends by bolts and nuts $d'$ $e'$, so that they can be conveniently removed, exchanged, and reversed to enable the device to be connected with a right or left harvester. The horizontal bars D E are attached to the posts B C at points at about one-third the distance of their length from their rear ends, as shown in Figs. 1 and 2. The longer end of the inner horizontal bar D is supported by an inclined brace, F, the upper end of which is secured to the forward end of the said bar D by a bolt and nut. The rear or lower end of the brace-bar F is secured to the lower part of the inner post B by a bolt and nut, $f'$, which bolt passes through a hole in the said post B and through a slot in the said brace F. The forward or longer end of the outer horizontal bar E is supported by the brace G, the lower and forward end of which is secured to the bar E about midway between its forward end and the bolt $e'$. The upper and rear end of the brace G is secured to the upper end of the post C by a bolt and nut, $g'$, which passes through a hole in the upper end of the post C and through a slot in the brace G. Several holes are formed in the posts B C to receive the bolts $d'$ $e'$, so that, by removing the bolts $d'$ $e'$ and loosening the nuts of the bolts $f'$ $g'$, the horizontal bars D E and their attachments may be raised and lowered as required. H are two frames exactly alike, and each consisting of two side bars connected by two or more cross-bars. In bearings in the ends of the side bars of the frames H revolve shafts I. The adjacent ends of the shafts I of the two frames H are rigidly connected by the bars J. To the outer ends of the shafts I of the outer frame H are rigidly but detachably attached two cranks, K, the crank-pins of which revolve in bearings attached to the upper edge of the end parts of the bar E. To the inner ends of the shaft I of the inner frame H are rigidly but detachably attached the cranks L, the crank-pins of which revolve in bearings attached to the upper edge of the end parts of the bar D. To the projecting end of the crank-pin of the rear crank L is attached a short crank, M, to the crank-pin of which is pivoted the rear end of a connecting-rod, N, the other end of which is pivoted to the crank fly-wheel O attached to the crank-pin of the forward crank L. The crank fly-wheel O also serves as a pulley to receive a belt or chain, by which the device is driven from the mechanism of the reaper or mower. The connecting-rod N keeps the frame H level in all parts of its movement. To the cross-bars of the frames H are attached teeth or fingers P Q. The fingers P project downward at the rear side of the frame H in such a position that, when the frames are moving to the rearward through the lower part of their movement, the said fingers P will push the cut grain or grass back from the cutters, leaving the cutters free to do their work. The fingers Q project downward at the forward side of the frames H, and are arranged in two parallel rows at the distance of a foot, more or less, from each other. The fingers Q are designed to take hold of the grain, straighten it up when bent down, and bring it into proper position to be operated upon by the cutters.

By detaching the cranks K L from the bars E D and shafts I, and the bars E D from the posts C B, the said bars E D may be exchanged and reversed and the frame H reversed, thus adapting the device for attachment to a right or left harvester or mower, as may be required.

Having thus described my invention, I claim as new and desire to secure by Letters Patent—

1. The frame H, provided with rear and front fingers P Q, either or both, for attachment to harvesters and mowers, substantially as herein shown and described, and for the purposes set forth.

2. The combination of the posts B C, horizontal bars D E, braces F G, frames H provided with fingers P Q, either or both, shafts I, connecting-bars J, cranks K L, crank M, connecting-rod N, and crank fly-wheel pulley O, with each other, to adapt them for attachment to harvesters and mowers, substantially as herein shown and described, and for the purposes set forth.

GEORGE H. WELLER.

Witnesses:
JAMES M. KENNEDY,
SAMUEL C. CARHART.